US012552001B2

(12) United States Patent
Yang

(10) Patent No.: US 12,552,001 B2
(45) Date of Patent: Feb. 17, 2026

(54) MULTIFUNCTIONAL TOOL

(71) Applicant: Ming Yang, Alberta (CA)

(72) Inventor: Ming Yang, Alberta (CA)

( * ) Notice: Subject to any disclaimer, the term of this patent is extended or adjusted under 35 U.S.C. 154(b) by 355 days.

(21) Appl. No.: 17/844,194

(22) Filed: Jun. 20, 2022

(65) Prior Publication Data

US 2022/0402109 A1 Dec. 22, 2022

(51) Int. Cl.
*B25F 1/04* (2006.01)
*B25F 1/00* (2006.01)

(52) U.S. Cl.
CPC ................ *B25F 1/04* (2013.01); *B25F 1/003* (2013.01)

(58) Field of Classification Search
CPC ...... B25F 1/00; B25F 1/04; B25F 5/00; B25F 1/003; B25B 13/08; B25B 13/28; B25B 13/36; B25B 13/38; B25B 13/505; B25B 7/22; B26B 11/00
See application file for complete search history.

(56) References Cited

U.S. PATENT DOCUMENTS 189,567 A * 4/1877 Mathews ................ B25B 13/28 81/99
888,795 A * 5/1908 Fields ..................... B26B 11/00 7/118
4,744,272 A * 5/1988 Leatherman ............ B25F 1/003 7/128
6,286,397 B1 * 9/2001 Taggart ..................... B25F 1/04 81/177.4
6,971,288 B2 * 12/2005 Wei ....................... B25B 13/505 81/111
7,020,923 B1 * 4/2006 Jangula ..................... B25F 1/04 81/177.4
D834,910 S * 12/2018 Zhang .............................. D8/81
D980,688 S * 3/2023 Yang .............................. D8/105
2016/0167213 A1 * 6/2016 Adelman ................ B25B 13/08 7/138

FOREIGN PATENT DOCUMENTS

CN 215881528 * 2/2022

* cited by examiner

*Primary Examiner* — Robert J Scruggs
(74) *Attorney, Agent, or Firm* — David & Raymond Patent Firm; Raymond Y Chan

(57) ABSTRACT

A multifunctional tool includes a docking frame which includes a first body having a front end portion and a second end portion extending inclinedly rearwards from the first body, a first actuation assembly which includes a first coupling unit and an engaging head mounted to the first end portion of the first body by means of the first coupling unit and has an engaging opening formed and defined between the engaging head and the first end portion of the first body, and a second actuation assembly which includes a first coupling unit and a cutting element pivotally and movably mounted to the second body by means of the second coupling unit. The multifunctional tool integrates various functions of multiple tools in one body while various function tools thereof compactly arranged together to form a simple and compact structure.

20 Claims, 8 Drawing Sheets

MULTIFUNCTIONAL TOOL

CROSS REFERENCE OF RELATED APPLICATION

This application is a non-provisional application that claims the benefit of priority under 35 U.S.C. § 119(e) to a Chinese application, application number 202110688006.2, filed Jun. 21, 2021, which is incorporated herewith by reference in its entirety.

BACKGROUND OF THE PRESENT INVENTION

Field of Invention

The present invention relates to a tool, and more particularly to a multifunctional tool.

Description of Related Arts

In daily life, it is often necessary to prepare various handy tools, such as wrenches, screwdrivers, and etc., for use anytime anywhere. However, the management of various tools is a tedious task. Various tools have different applications and are placed in different places usually. The user may spend a lot of time to locate the various tools, especially when the user forgets where the tools are placed or when the user needs to use the tools outdoor. Moreover, in the actual application scenario, the user may need a variety of tools at the same time, not only to find a variety of tools taking a lot of time, after the various tools are used, it also takes a lot of time to reorganize various tool after the various tools are used. Also, some tools may be missed or lost during collation.

In addition, some tools are heavy and occupy much space that is not conducive to carrying around. When carrying a variety of tools outdoor, it is necessary to configure a specific space to store and carry that significantly causes much inconvenience to the user.

Accordingly, a multifunctional tool is a desire product to most users, which is preferred to integrate multiple tools having different functions into a single unit. However, due to the integration of a variety of tools, these tools have problems of being relatively large in size, heavy in weight, difficult to carry, structural complex, complicated in production, and etc.

Therefore, the present invention is to provide an innovative multifunctional tool that not only can integrate multiple functions of a plurality of tools but also can substantially arrange various functional components together in a simple and compact manner.

SUMMARY OF THE PRESENT INVENTION

The invention is advantageous in that it provides a multifunctional tool which is capable of not only integrating multiple functions of various tools in an integral unit, but also arranging various functional components together in a simple and compact manner.

Another advantage of the invention is to provide a multifunctional tool which has a relatively compact structure facilitating to be carried.

Another advantage of the application is to provide a multifunctional tool, wherein at least a function member is arranged to be angled with a docking frame of the multifunctional tool that substantially increases a leverage force for applying to a working object with relatively less effort.

Another advantage of the present application is to provide a multifunctional tool which does not include any expensive or complex structure or component while providing an economical and efficient configuration to achieve the above objectives and arranging multiple function members in a compact manner.

According to the present invention, the foregoing and other objects and advantages are attained by a multifunctional tool, comprising:

a docking frame, comprising a first body having a first end portion and a second body inclinedly extended rearwards from the first body;

a first actuation assembly, comprising a first coupling unit and an engaging head mounted to the first end portion of the first body by means of the first coupling unit, wherein an engaging opening is formed and defined between the engaging head and the first end portion of the first body; and a second actuation assembly, comprising a second coupling unit and a cutting element pivotally and movably mounted to the second body by means of the second coupling unit.

In one embodiment, the engaging head is arranged to be capable of moving with respect to the first end portion so as to adjust the engaging opening between an open state and a closed state.

In one embodiment, the engaging head is pivotally mounted to the first end portion of the first body by means of the first coupling unit such that the engaging head is able to be pivotally moved from the first end portion to the open state and to pivotally moved toward the engaging member to the closed state.

In one embodiment, the engaging head comprises a neck portion, a beak portion integrally extended from the neck portion, and a crown portion extending outwards from the beak portion.

In one embodiment, the crown portion of the engaging head has a perforation formed therethrough.

In one embodiment, at least one side of two opposing sides along a thickness direction of the crown portion of the engaging head has a trapezoidal shape.

In one embodiment, the front end portion of the first body has a first serrated jaw provided thereon.

In one embodiment, an inner wall of the engaging head has a second serrated jaw provided thereon.

In one embodiment, the configuration of the front end portion of the first body and the engaging head is a hawk wrench configuration having the engaging opening.

In one embodiment, the docking frame further comprises a first stopper formed on the front end portion of the first body, configured to block the unintended movement of the engaging head so as to ensure an angle of the engaging opening within a predetermined angle range.

In one embodiment, the cutting element is piovtally mounted to the second body in a movable manner.

In one embodiment, the second actuation assembly further comprises an auxiliary member mounted to the cutting element.

In one embodiment, the docking frame further comprises a second stopper formed at the first body and the second body, configured for blocking any unintended movement of the cutting element.

In one embodiment, a receiving slot is defined by the second stopper, a portion of the surface of the first body and a portion of the surface of the second body.

In one embodiment, the second body has a dovetail member, which comprises a first wedge tip and a second wedge tip, and has a gap formed between the first and second wedge tips.

In one embodiment, the docking frame further comprises a meandering member, which has a curved wall and a slope surface extending from the curved wall, wherein a meandering slot is defined by the curved wall of the meandering member and a side wall of the first body or a side wall of the second body.

In one embodiment, the multifunctional tool further comprises a retainer configuration provided at the docking frame.

In one embodiment, the multifunctional tool further comprises a magnetic configuration provided at the docking frame.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
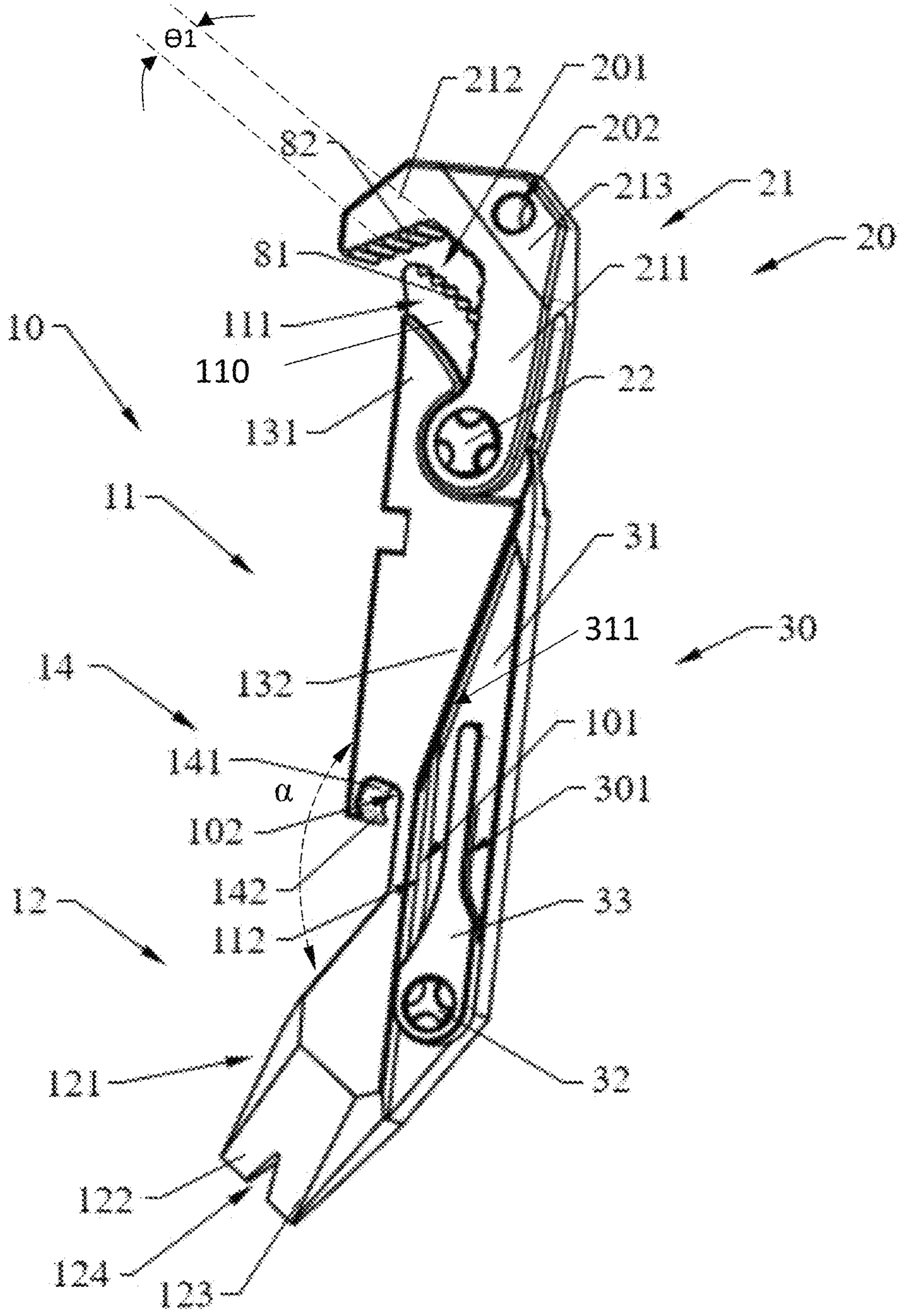
FIG. 1 is a perspective view of a multifunctional tool according to a preferred embodiment of the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Those skilled in the art will appreciate that in the disclosure of the present invention, wherein the orientation or position relationship indication terms such as "vertical", "horizontal", "up", "Bottom", "Front", "Back", "Left", "Right", "Vertical", "Horizontal", "Top", "Bottom", "Inside", "Outside", and etc. are based on the orientation or position relationship shown in the drawings, which is only intended to facilitate the description of the present application and simplify the description, and does not indicate or imply that the device or element referred to must have a specific orientation, constructed and operated in a particular orientation, so the above terms should not be construed as a limitation to the scope of the claimed invention.

According to the present invention, the term "one" in the claims and specification should be understood to mean "one or more", i.e., in one embodiment, the number of an element may be one, and in another embodiment, the number of elements may be more than one. Unless the disclosure of the present invention expressly indicates that the number of elements is only one, the term "one" should not be construed as unique or single, the term "one" should not be construed as limitation of the number.

In the description of the present invention, it should be understood that the "first", "second", etc. are only for descriptive purposes, and should not be understood as indicating or implying relative importance. In the description of the present invention, it should be noted that, unless otherwise expressly specified and qualified, belonging to "connected", "connection" should be understood broadly, for example, may be a fixed connection, may also be a detachable connection or integrated connection, may be a mechanical connection or an electrical connection, may be a direct connection or an indirect connection through a medium. For those of ordinary skill in the art, the specific meaning of the above terms in the present invention may be understood on a case-by-case basis.

In the description of the present invention, the reference terms "an embodiment", "some embodiments", "examples", "specific examples", or "some examples", etc. are intended to mean a specific feature, structure, material, or feature described in conjunction with the embodiment or example that is included in at least one embodiment or example of the present application. In the present invention, the schematic formulation of the above terms does not have to be directed at the same embodiment or example. Further, the specific features, structures, materials, or features described may be combined in any one or more embodiments or examples in a suitable manner. Further, without contradictory, those skilled in the art may combine and combine different embodiments or examples described in the present specification and features of different embodiments or examples.

Referring to FIG. 1 to FIG. 8 of the drawings, the multifunctional tool comprises a docking frame 10, a first actuation assembly 20 and a second actuation assembly 30, wherein the first actuation assembly 20 and the second actuation assembly 30 are arranged in the docking frame 10 in a compact manner. Specifically, according to the preferred embodiment, the docking frame 10 includes a first body 11 and a second body 12 rearwardly extended integrally and inclinedly from the first body 11, defining a predetermined angle therebetween, i.e. the first body 11 and the second body 12 are extended inclinedly with respect to each other. The first actuation assembly 20 and the second actuation assembly 30 are arranged in the first body 11 and the second body 12 respectively.

In the preferred embodiment, the first body 11 has a front end portion 111 and a rear end portion 112 rearwardly extended from the front end portion 111. The first actuation assembly 20 includes an engaging member 110 integrally formed at the front end portion 111, an engaging head 21 and a first coupling unit 22 configured to pivotally mount the engaging head 21 in a movable manner to the first front portion 111, such that an engaging opening 201 is formed and defined between the engaging head 21 and the engaging member 110 formed at the front end portion 111 of the first body 11. The engaging opening 201 is adapted for engaging an object (such as a nut) being acted. Alternatively, the engaging head 21 may also be fixedly mounted at the front end portion 111 by means of the first coupling unit 22.

Figure 5:
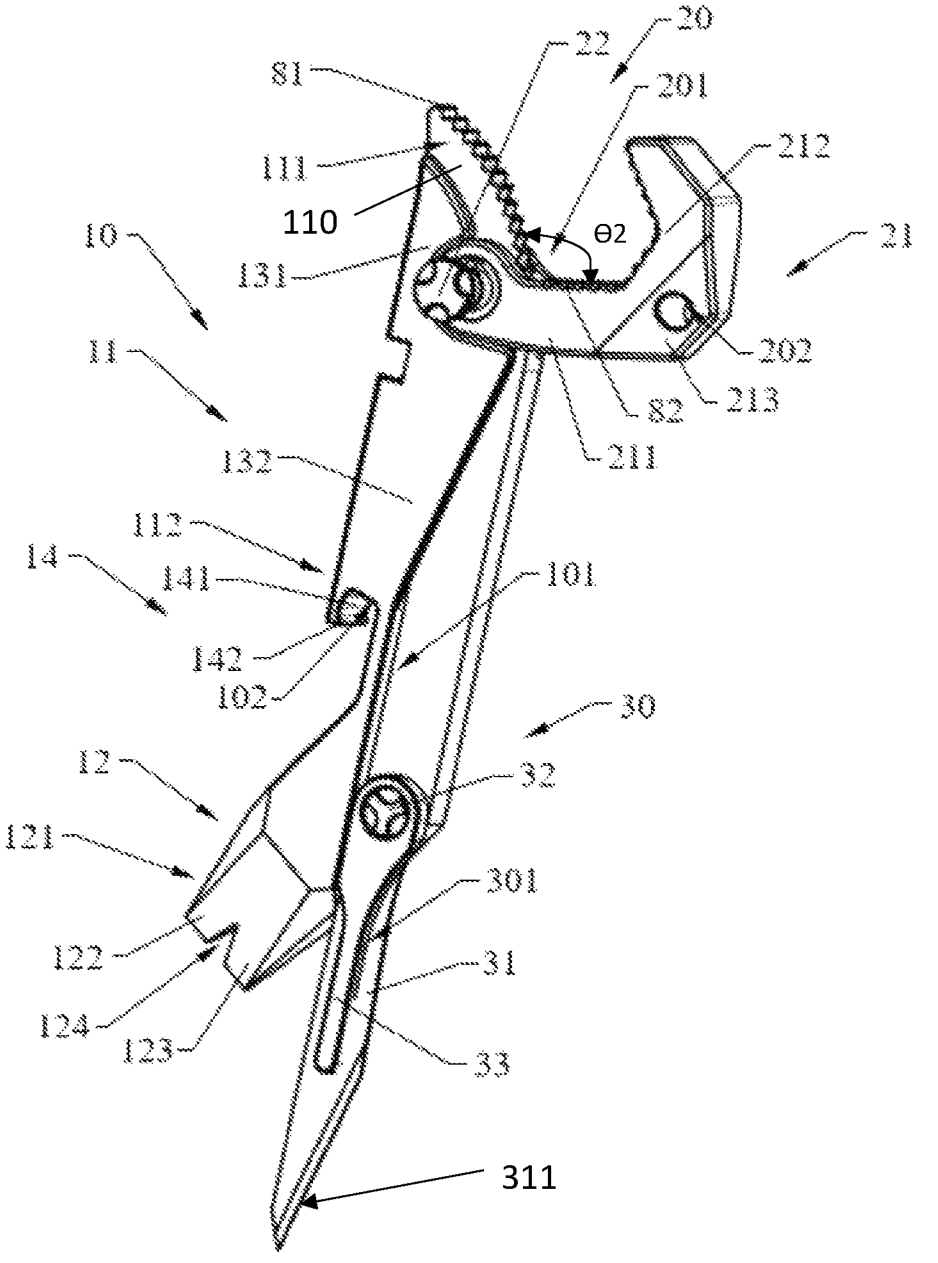
FIG. 5 is a perspective view of the multifunctional tool, where the first and second actuation assemblies are in open state, according to the above preferred embodiment of the present invention.

Specifically, according to the preferred embodiment, the engaging head 21 is movably mounted in the front end portion 111 of the first body 11 by the first coupling unit 22, and is configured to move with respect to the first body 11 between an open state and a closed state, i.e., operating the first actuation assembly 20 to position between the open state as shown in FIG. 1 and the closed state as shown in FIG. 5. Along with the movement of the engaging head 21 relative to the first body 11, a size of the engaging opening 201 between the engaging head 21 and the engaging member 110 at the front end portion 111 of the first body 11 varies correspondingly, so as for engaging with objects with different sizes.

More particularly, the engaging head 21 is movably mounted in a pivotable manner to the front end portion 111 of the first body 11, by such a manner that the engaging head 21 is capable of rotating about the first coupling unit 22 as a pivot axis, the size of a space of the engaging opening 201 defined between the engaging head 21 and the engaging member 110 of the front end portion 111 of the first body 11 changes accordingly at the same time.

It is appreciated that, in the preferred embodiment, the docking frame 10 further comprises a first stopper 131 formed in the front end portion 111 of the first body 11, adapted for blocking unintended movement of the engaging head 21, ensuring an angle of the engaging opening 201 within a predetermined angle range. In particular, the first stopper 131 is embodied as a panel element protruded on a side wall of the front end portion 111 of the first body 11, and is formed surrounding the first coupling unit 22 in such a manner that the engaging head 21 can be rotated about an axle of the first coupling unit 22 towards the engaging member 110 until being blocked by one end the first stopper 131 to the closed state, as shown in FIG. 1, where a minimum angle ⊖1 of the engaging opening 201 defined between the movable engaging head 21 in such closed state and the stationary engaging member 110 is limited, and that the engaging head 21 can be rotated about the axle of the first coupling unit 22 away from engaging member 110 until being blocked by the other end of the first stopper 131 to the open state, as shown in FIG. 5, where a maximum angle ⊖2 of the engaging opening 201 defined between the engaging head 21 in such open state and the engaging member 110 is limited. When the engaging head 21 is rotated about the first coupling unit 22 as the pivot axis along a first direction (e.g., counterclockwise direction) to the first position, as shown in FIG. 1, the first stopper 131 prevents the engaging head 21 continuing to rotate in the first direction due to the protruded first stopper 131 from the side wall of the front end portion 111. When the engaging head 21 is rotated in a second direction opposite to the first direction (e.g., clockwise direction) to a second position, as shown in FIG. 5, the first stopper 131 prevents the engaging head 21 to continue to rotate in the second direction by means of the protruded first stopper 131 at the side wall of the front end portion 111, such that the angle of the engaging opening 201 defined between the engaging head 21 and the engaging member 110 is limited within the predetermined angle range. In the preferred embodiment, the predetermined angle range (⊖1 to ⊖2) of the engaging opening 201 can be embodied as 0° to 90°. That is the predetermined angle range of the engaging opening 201 may have a critical value of 90°. In other words, the engaging opening 201 may be opened to 90° by rotating the engaging head 21 away from the engaging member 110. In other embodiments, the threshold value of the predetermined angle range of the engaging opening 201 may be set to other values, such as 120°.

In one embodiment, the first stopper 131 can be formed integrally on the front end portion 111 of the first body 11 by a molding process, so that the structure of the multifunctional tool is relatively simple and the production process is relatively simple. In other alternative embodiments of the invention, the first stopper 131 may also be formed on the first body 11 by means of welding, attaching, affixing, mounting, sleeving, and the like.

In the preferred embodiment, when the engaging opening 201 is in the open state, and engages with the object being acted upon, the first body 11 or the second body 12 may be used as a grip arm which is able to be rotated to drive the object being engaged by the engaging head 21 and the engaging member 110 at the same time to rotate so as to install (fasten) or remove (unfasten) the object that the multifunctional tool is utilized as a wrench.

In particular, in the preferred embodiment, the second body 12 extends inclinedly with respect to the first body 11 defining an inclusion angle $\alpha$ therebetween, as shown in FIG. 1, when the second body 12 is used as the grip arm to drive the engaged object to rotate, the inclined second body 12 substantially effects as a leveling arm to increase a leveling force that facilitates the driving of the rotation of the engaged object with relatively smaller effort. That is, by means of the first body 11 and the second body 12, the multifunctional tool may be utilized in a more labor-saving manner to act upon the object. Specifically, according to the present invention, the inclusion angle $\alpha$ between the second body 12 and the first body 11 is greater than or equal to 90° and less than 180°. In the preferred embodiment, the inclusion angle $\alpha$ between the second body 12 and the first body 11 is designed to be 145°. In other embodiments, the inclusion angle between the second body 12 and the first body 11 can be designed to be 90°, 150°, or other values. In an alternative mode of the preferred embodiment, the inclusion angle $\alpha$ between the second body 12 and the first body 11 may also be greater than 0° less than 90°, e.g., 45° and 60°.

Further, in the preferred embodiment, the space between the engaging head 21 and the engaging member 110 of the front end portion 111 of the first body 11 forms the engaging opening 201 having a hawk beak shape. It should be appreciated that, in an alternative mode of the preferred embodiment, the space between the engaging head 21 and the engaging member 110 of the front end portion 111 of the first body 11 may from the engaging opening 201 with other shapes, such as O shape.

Further, a first serrated jaw 81 is formed at a front side of the engaging member 110 of the front end portion 111 of the first body 111, and a second serrated jaw 82 is formed at an inner side of the engaging head 21. Thus, the engaging opening 201 defined between the engaging head 21 and the engaging member 110 at the front end portion 111 of the first body 11 is a serrated jaw type opening, such that the friction provided at the engaging opening 201 with respect to the engaged object is increased so as to firmly and securely engaged the object by the engaging head 21.

As shown in FIG. 1 to FIG. 4, in the preferred embodiment, the engaging head 21 includes a neck portion 211, a beak portion 212 integrally and curvedly extended from the neck portion 211 and a crown portion 213 extending outwards from the beak portion 212, wherein the neck portion 211 and the beak portion 212 of the engaging head 21 and the engaging member 110 at the front end portion 111 of the first body 11 define the engaging opening 201. A head portion of the engaging head 21 has a perforation 202 which penetrates through the engaging head 21 along a thickness direction and is adapted for a rope, a hanging ring, or etc. connecting thereto, so that the multifunctional tool is easy to carry or may be hung to a convenient place for use, such as neck, clothing, wall, handlebar, and the like.

Figure 4:
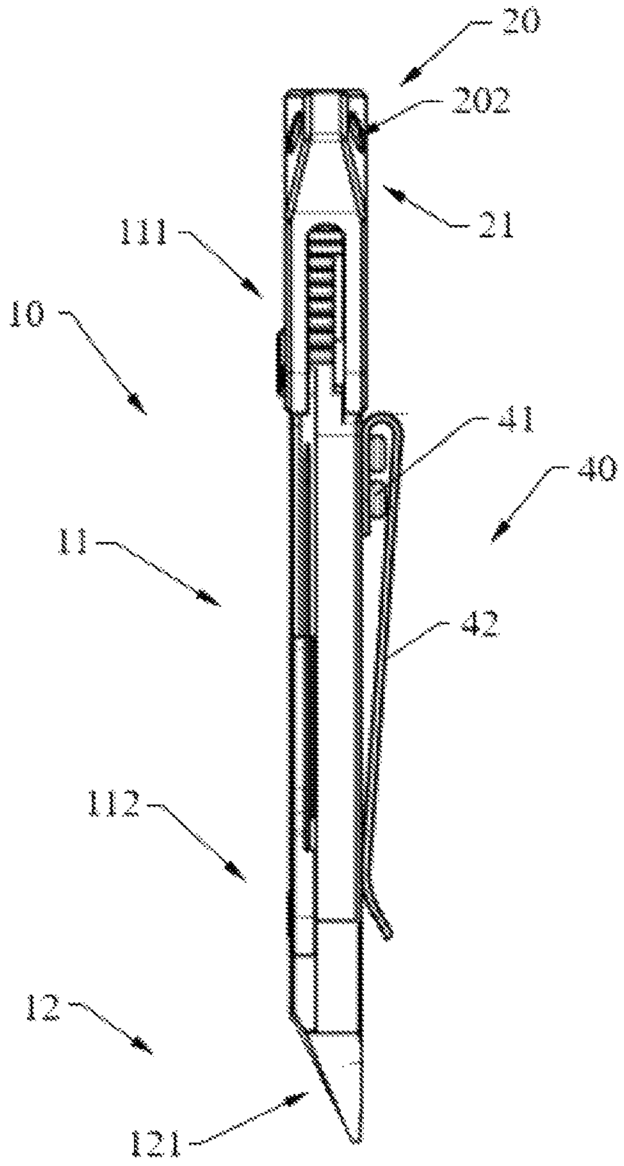
FIG. 4 is another side elevation view of the multifunctional tool according to the above preferred embodiment of the present invention.

It is worth mentioning that, in order to easily form the perforation 202 during a drilling process, and to facilitate the penetrating of a hanging element such as a hanging ring therethrough, a thickness of the crown portion 213 is preferred to be the thinner the better. However, at the same time, the strength of the engaging head 21 must also be ensured. Therefore, the thickness of the crown portion 213 is designed to gradually increase inwardly from the position of the perforation 202. Accordingly, as shown in FIG. 1 and FIG. 4, at least one side of two sides of the crown portion 213 of the engaging head 21, along a thickness direction thereof, has a trapezoidal shape.

In the preferred embodiment, the second actuation assembly 30 includes a second coupling unit 32 and a cutting element 31 such as a knife is movably mounted to the second body 12 by the second coupling unit 32. Specifically, the cutting element 31 is pivotally mounted to the second body 12 in a foldable manner in such a manner that the cutting element 31 can be rotated about the second coupling unit 32, functioned as a pivot axle, to selectively move to an open state (unfolded condition) that, as shown in FIG. 5, the cutting element 31 is rotated to unfold and extend out, or a closed state (folded condition) that, as shown in FIG. 1, the cutting element 31 is rotated to fold to overlap with the second body 12 of the docking frame 10.

It is worth mentioning that the cutting element 31 is mounted to the second body 12, adjacent to a joint position where the first body 11 and the second body 12 connected. When the cutting element 31 is in the folded condition, as shown in FIG. 1, the cutting element 31 is located and overlapped on a side wall of the first body 11 while a blade 311 of the cutting element 31 is facing inwards to avoid exposing outside. When the cutting element 31 is in the unfolded condition, as shown in FIG. 5, the second body 12, which is extended inclinedly with respect to the first body 11, is positioned away from the blade 311 of the cutting element 31 to ensure safety while the user may grip on the first body 11 as a handle to use the exposed blade 311 of the unfolded cutting element 31 to work on an object (such as a rope) to be cut. In addition, the first body 11 while it is used a gripping arm substantially increases a leveling force for labor-intensively acting against the object being act upon with less effort.

In view of above, the engaging head 21 and the cutting element 31 are arranged at both ends of the docking frame 10, i.e. the front end portion 111 of the first body 11 and the second body 12 respectively, such that when the engaging head 21 engages against the engaged object, the second body 12 is utilized as the gripping arm that substantially increases the leveling force for relatively acting on the engaged object with less effort. When the cutting element 31 is unfolded and used the object being cut, the first body 11 is utilized as the gripping arm that substantially increases the leveling force for relatively acting the object being cut with less effort. The V-shape configuration of the first body 11 and the second body 12 of the docking frame 10 not only provides a more compact structure, but also allows the first and second actuation assemblies 20, 30 to be used in a relatively labor-saving manner.

According to the preferred embodiment, the docking frame 10 further comprises a second stopper 132 formed on the first body 11 and the second body 12, which is adapted for blocking any unintended movement of the cutting element 31. In particular, the second stopper 132 is protrudingly formed on the side wall of the first body 11 and the second body 12, wherein the second stopper 132 and portions of surfaces of the first and second bodies 11, 12 defines a receiving slot 101 adapted for receiving the folded cutting element 31 therein, as shown in FIG. 1 and FIG. 5. When the cutting element 31 is received in the receiving slot 101, the slanted blade 311 of the cutting element 31 faces towards and aligned with a slanted inner wall of the receiving slot 101 to avoid unintended contact with anything.

When the cutting element 31 is rotated about the second coupling unit 32 as the pivot axle along a first direction (e.g., counterclockwise direction) to the folded position (condition), as shown in FIG. 1 to FIG. 4, the second stopper 132 protruded on the first body 11 and the second body 12 blocks and prevents the cutting element 31 from continuing to rotate in the first direction. When the cutting element 31 is rotated in a second direction opposite to the first direction (e.g., clockwise direction) to the unfolded position (condition), a lower portion of the second stopper 132 protruded on the second body 12 blocks and prevents the cutting element 31 from continuing to rotate in the second direction and retains the cutting element 31 in the extending unfolded condition as shown in FIG. 5 to FIG. 8, especially when the blade 311 is applying a cutting force towards a direction away from the second stopper 132.

In the preferred embodiment, the second stopper 132 is formed integrally with the first body 11 and the second body 12 by molding. In an alternative mode of the preferred embodiment, the second stopper 132 may also be provided on the first body 11 and the second body 12 by various ways such as welding, affixing, mounting and the like.

In particular, in the preferred embodiment, the first stopper 131 and the second stopper 132 are integrally made to form a protruded configuration on the side wall of the first body 11 and the second body 12, so that the structure and the production process of the multifunctional tool are relatively simple.

Figure 6:
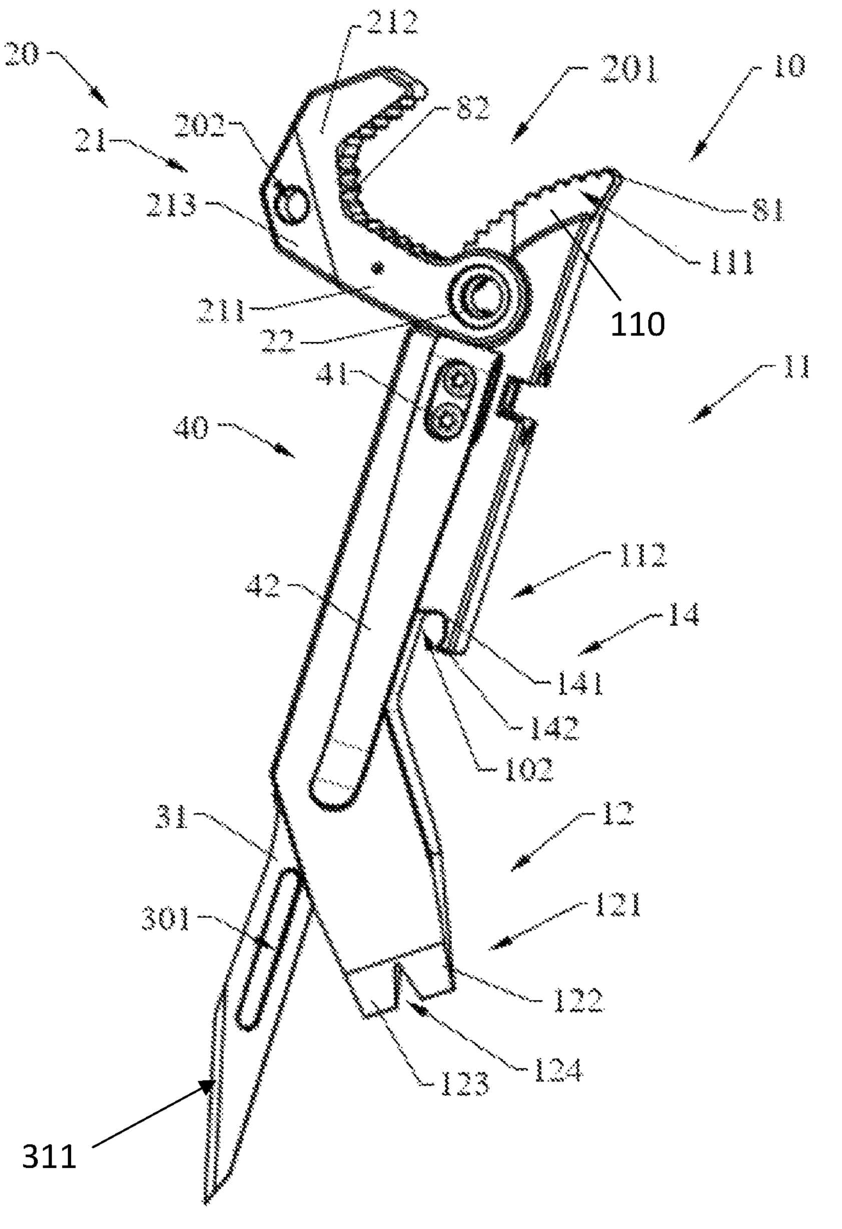
FIG. 6 is another perspective view of the multifunctional tool, where the first and second actuation assemblies are in open state, according to the above preferred embodiment of the present invention.

In this embodiment, as shown in FIG. 1 and FIG. 5, the second actuation assembly 30 further comprises an auxiliary member 33 mounted on an outer side of the cutting element 31 and configured to be toggled to drive the cutting element 31 to rotate outwards to unfold the cutting element 31 to the unfolded condition or inwards to fold the cutting element 31 to the folded condition. In addition, the cutting element 31 has a mounting slot 301 such that the auxiliary member 33 is mounted to cutting element 31 by mounting in the mounting slot 301, as shown in FIG. 6. It should be appreciated that the auxiliary member 33 may also be mounted to the cutting element 31 by other means, such as affixing, welding and the like.

Figure 2:
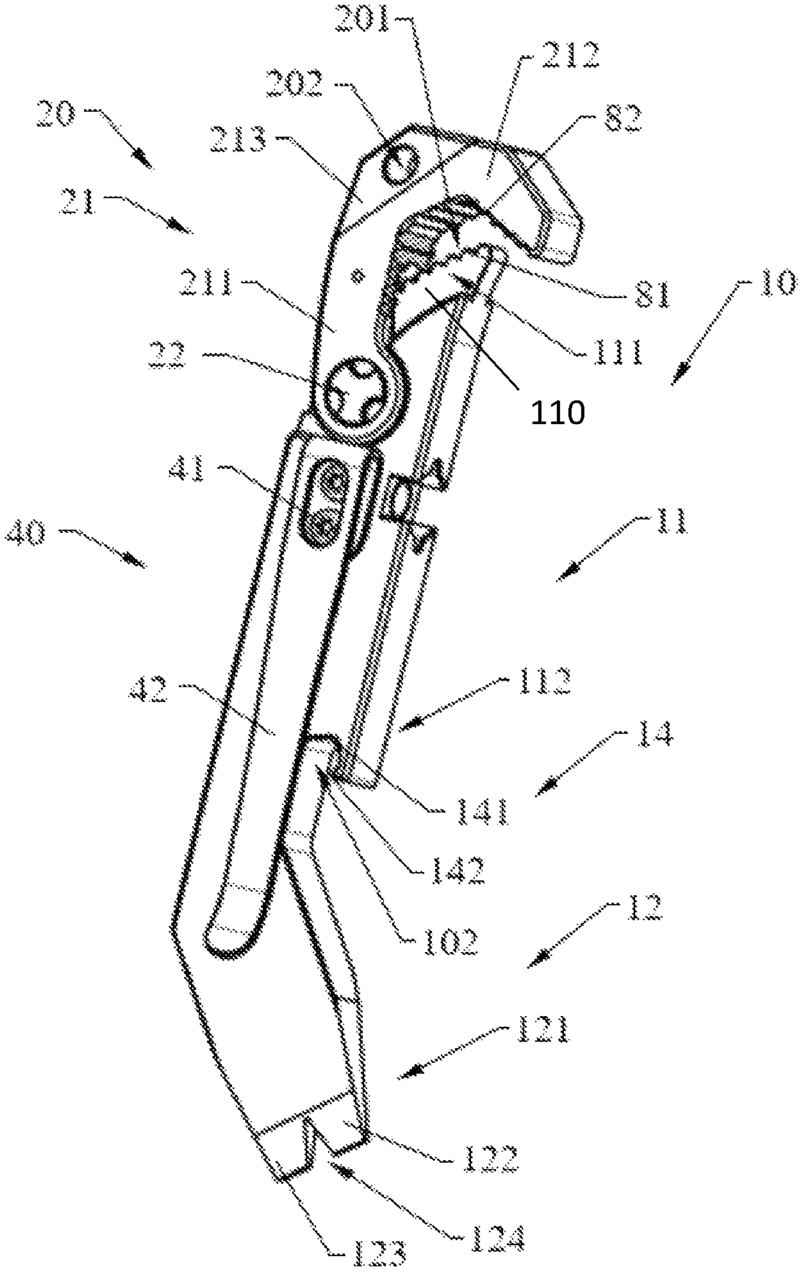
FIG. 2 is another perspective view of the multifunctional tool according to the above preferred embodiment of the present invention.
Figure 3:
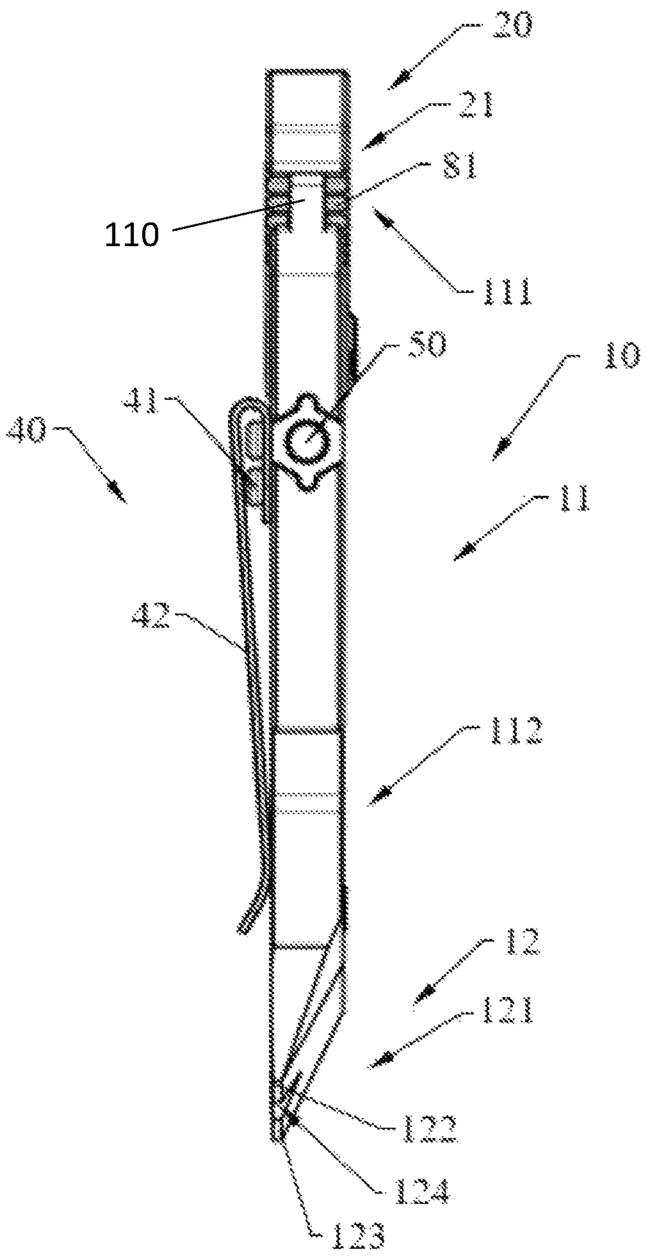
FIG. 3 is a side elevation view of the multifunctional tool according to the above preferred embodiment of the present invention.

As shown in FIG. 1 to FIG. 3, the second body 12 comprises a dovetail member 121 integrally extended from a rear end thereof, wherein the dovetail member 121, having a triangular cross section, includes a first wedge tip 122 having a first tip width and a second wedge tip 123 having a second tip width, and has a V-shape gap 124 formed between the first and second wedge tips 122, 123. In particular, the first wedge tip 122 and the second wedge tip 123 are configured to be used independently as a screwdriver tip for driving screws within a corresponding size range.

It is worth mentioning that the widths of the first and second wedge tips 122, 123 can be the same or different. To a larger size screw, the first and second wedge tips 122, 123 can be combined to use as a larger size screwdriver tip by inserting both the first and second wedge tips 122, 123 into a wider slot (approximately equal to an overall width of the driver member 121) of a larger screw so as to securely twist and drive the larger screw to rotate. In other words, the configuration the first wedge tip 122 and the second wedge structure 123 allows the driver member 121 to have a wider size range of application, equivalent to multiple screwdrivers with various sizes and specifications. In view of above, the second body 12 of the multifunctional tool of the present invention not only can be used as a screwdriver, but also broadens its scope of application.

In particular, the gap 124 formed between the first wedge structure 122 and the second wedge structure 123 renders the second body 12 to be used as a nail puller to pry nails. Specifically, the gap 124 allows the nail cap of a nail being stuck between the first wedge tip 122 and the second wedge tip 123, such that by gripping on first body 11 and driving the docking frame 10, the nail can easily be pried up by leverage. It is worth mentioning that the angular configuration of the second body 12 with respect to the first body 11 allows the first body 11 to be utilized as a handle when the second body 12 is utilized as a screwdriver or nail puller, wherein the inclusion angle between the first body 11 and the second body 12 ensures a better application angle for the user to rotate or to pry the second body 12 while gripping on the first body 11 with a relatively larger torque and less effort, wherein the user may use his or her thumb pressing down against the second body 12 while the other four fingers gripping on the first body 11.

Further, the docking frame 10 further comprises a meandering member 14 integrally formed at the first body 11 or the second body 12 to function as a bottle opener. In particular, the meandering member 14 has a curved wall 141 and a slope surface 142 extending from the curved wall 141, wherein a meandering slot 102 is defined by the curved wall 141 of the meandering member 14 and a sidewall of the first body 11 or a sidewall of the second body 12. According to the preferred embodiment, the meandering member 14 is integrally formed at the first body 11 and the meandering slot is defined by the curved wall 141 and the sidewall of the first body 11, as shown in FIGS. 1, 2, 5 and 6. Thus, the meandering member 14 may be used to engage a cap of a bottle in the meandering slot 102, wherein an edge of one side of the bottle cap is pressed by the slope surface 142 while a surface of another side of the bottle cap is pressed by the side wall of the first body 11 or the side wall of the second body 12, thereby the cap can be pried from the bottle by means of leverage. The meandering member 14 of the multifunctional tool according to the preferred embodiment is provided in the first body 11 or the second body 12, and thus by means of the side wall of the first body 11 or the side wall of the second body 12 to form the meandering slot 102, thereby the bottle opener is simply and compactly arranged in the docking frame 10.

It is worth mentioning that the meandering slot 102 defined by the curved wall 141 of the meandering member 14 and the sidewall of the first body 11 or the sidewall of the second body 12 is an open cavity, which can accommodate bottle caps of different sizes. That is, the multifunctional tool can be utilized as a bottle opener, and can be used for bottles with different sizes of bottle caps.

Figure 8:
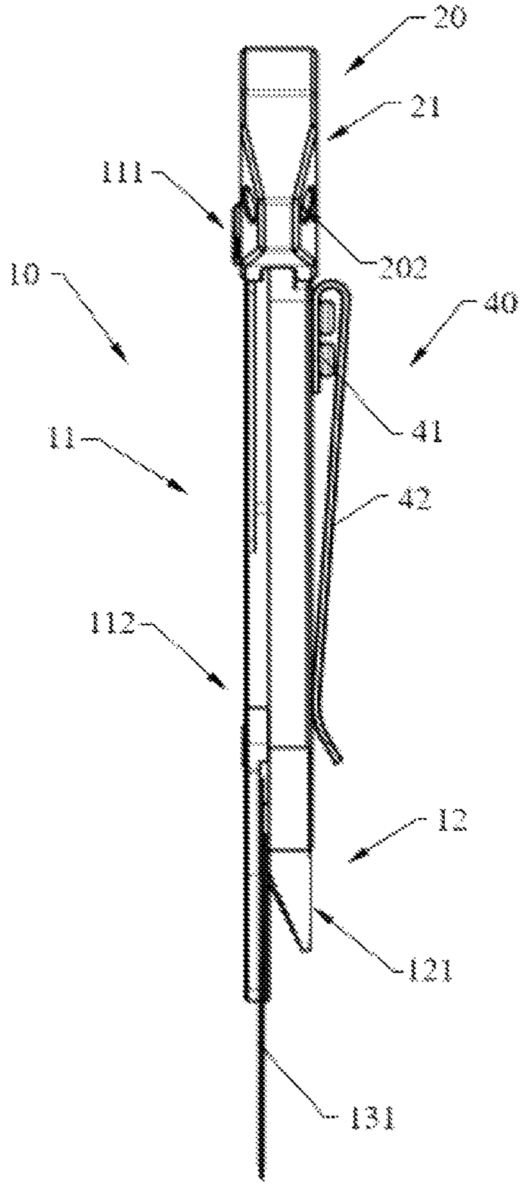
FIG. 8 is another side elevation view of the multifunctional tool, where the first and second actuation assemblies are in open state, according to the above preferred embodiment of the present invention.

In the preferred embodiment, the multifunctional tool further comprises a retainer configuration 40 provided on the docking frame 10, as shown in FIG. 4 and FIG. 8. By means of the retainer configuration 40, the multifunctional tool is able to be retained to backpack, pocket, and etc., so that the multifunctional tool is easy to be carried and is not easy to lose by retaining at an desire location. Specifically, the retainer configuration 40 includes at least one fastening element 41 and a clipping element 42 fastened to the docking frame 10 by the fastening element 41. The fastening element 41 may be implemented as one or more screws. It should be appreciated that the clipping element 42 may also be fastened to the docking frame 10 by other means, e.g., soldering, affixing, integral molding and the like.

Figure 7:
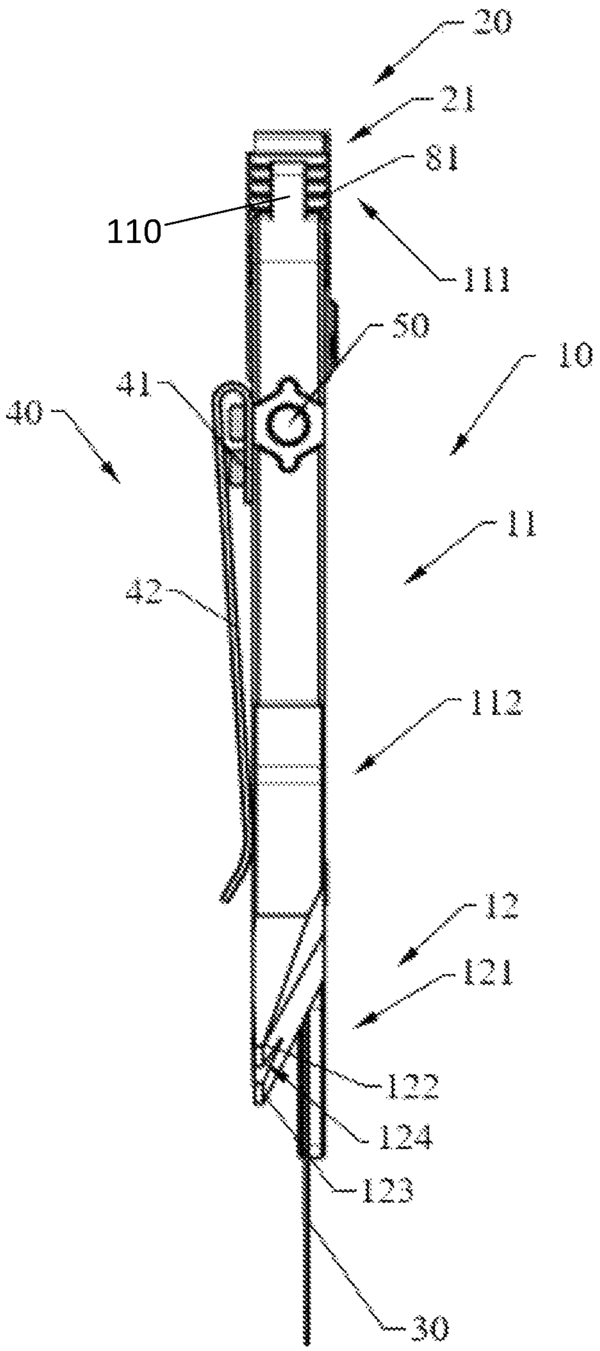
FIG. 7 is a side elevation view of the multifunctional tool, where the first and second actuation assemblies are in open state, according to the above preferred embodiment of the present invention.

Further, the multifunctional tool further comprises a magnetic configuration 50 formed in the docking frame 10, as shown in FIG. 3 and FIG. 7. By means of the magnetic configuration 50, the multifunctional tool may be attached to a desired location through magnetic attraction. Specifically, the magnetic configuration 50 may be implemented as a metal element having magnetic attraction capability, e.g., a mild steel, or alternatively may also be implemented as a magnetic element made of magnetic material having magnetic attraction capability.

In view of above, the multifunctional tool as disclosed is a single body providing multiple functions and utilizing as wrench, cutter, screwdriver, nail puller, bottle opener, and the like, which can be applied to a variety of scenarios and does not need to spend much time for locating different individual tools as usual. Further, through the arrangement of various tool elements and components in a specific manner according to the present invention, different functional tools are compact and simply integrated, rendering the multifunctional tool to have a compact structure, thereby making the multifunctional tool easy to carry.

Those skilled in the art will appreciate that the embodiment of the present application as shown in the above description and accompanying drawings is exemplary only and not intended to be limiting the present application. The objects of the present invention have been fully and effectively accomplished. The embodiments have been shown and described for the purposes of illustrating the functional and structural principles of the present invention and is subject to change without departure from such principles.

What is claimed is:

1. A multifunctional tool, comprising:

a docking frame, comprising a first body having a first end portion and a second body rearwardly extended integrally and inclinedly from the first body in a coplanar manner, and a meandering member integrally formed at the first body configured to function as a bottle opener for a cap of a bottle, wherein an inclusion angle larger than 90° and less than 150° is defined between the first body and the second body, wherein the meandering member has a curved wall and a slope surface extending from the curved wall, wherein a meandering slot is defined by the curved wall of the meandering member and a side wall of the first body, such that the meandering member is capable of engaging the cap of the bottle by a slope surface while a surface of another side of the bottle cap is pressed by the side wall of the first body, thereby the cap is able to be pried from the bottle by means of leverage;

a first actuation assembly, arranged in the first body of the docking frame, comprising a first coupling unit and an engaging head mounted to the first end portion of the first body by means of the first coupling unit, wherein an engaging opening is formed and defined between the engaging head and the first end portion of the first body;

a second actuation assembly, arranged in the second body of the docking frame, comprising a second coupling unit and a cutting element pivotally and movably mounted to the second body, adjacent to a joint position where the first body and the second body connected, by means of the second coupling unit in a foldable manner, such that the cutting element is able to be rotated about the second coupling unit, functioned as a pivot axle, to selectively move to an open state, that the cutting element is rotated to unfold and extend out, or a closed state, that the cutting element is rotated to fold to overlap with the second body of the docking frame, such that when the cutting element is in the close state, the cutting is located and overlapped on a side wall of the first body while a blade of the cutting element is facing inwards to avoid exposing outside, and that when the cutting element is in the open state, the blade of the cutting element is facing outwards and the second body, which is extended inclinedly with respect to the first body, is positioned away from the blade of the cutting element to ensure safety while the first body is used as a gripping arm for a user gripping thereon and increasing a leveling force for acting against an object being act upon; and a dovetail member, having a triangular cross section, integrally and inclinedly extended from a rear end of the second body of the docking frame, wherein the dovetail member includes a first wedge tip having a first tip width and a second wedge tip having a second tip width, and has a V-shape gap formed between the first wedge tip and the second wedge tip, such that the first wedge tip and the second wedge tip are coplanar with the first body and the second body and configured to be used independently as a screwdriver tip for driving screws within a corresponding size range and be combined to use a large size screwdriver tip by inserting both the first wedge tip and second wedge tip into a slot of a screw with large size, wherein the V-shape gap formed between first wedge tip and said second wedge tip renders the second body to be used as a nail puller, wherein the inclusion angle between the first body and the second body and sizes of the first body and the second body are arranged to allow the first body to be used as the gripping arm for four fingers of the user gripping thereon and a thumb of the user pressing down against the second body while the dovetail member is used as the screwdriver or the nail puller.

2. The multifunctional tool, as recited in claim 1, wherein the engaging head is pivotally mounted to the first end portion of the first body in a movable manner by means of the first coupling unit and configured to adjust a predetermined angle of the engaging opening between an open state and a closed state by rotating the engaging head about the first coupling unit as a pivot axle with respect to the first end portion of the first body, wherein the predetermined angle is ranged between 0° to 90°.

3. The multifunctional tool, as recited in claim 2, wherein the first actuation assembly further comprises an engaging member integrally formed at the first end portion of the first body and the engaging opening is formed and defined between the engaging head and the engaging member of the first end portion of the first body.

4. The multifunctional tool, as recited in claim 3, wherein the engaging head comprises a neck portion, a beak portion integrally extended from the neck portion, and a crown portion extending outwards from the beak portion, wherein a first serrated jaw is provided on the engaging member at the first end portion of the first body and a second serrated jaw is provided on an inner wall of the beak portion of the engaging head, such that the engaging opening is defined between the first serrated jaw and the second serrated jaw.

5. The multifunctional tool, as recited in claim 4, wherein the docking frame further comprises a second stopper formed in the first body and the second body and configured for blocking an unintended movement of the cutting element, wherein a receiving slot is defined by the second stopper, a portion of a surface of the first body and a portion of a surface of the second body and configured to receive the cutting element in the closed state.

6. The multifunctional tool, as recited in claim 2, wherein the engaging head comprises a neck portion, a beak portion integrally extended from the neck portion, and a crown portion extending outwards from the beak portion.

7. The multifunctional tool, as recited in claim 6, wherein a configuration of the first end portion of the first body and the engaging head is a hawk wrench configuration having the engaging opening.

8. The multifunctional tool, as recited in claim 2, wherein the docking frame further comprises a first stopper formed on the first end portion of the first body, configured to block an unintended movement of the engaging head so as to ensure the predetermined angle of the engaging opening ranged between 0° to 90°.

9. The multifunctional tool, as recited in claim 1, wherein the docking frame further comprises a second stopper formed in the first body and the second body and configured for blocking an unintended movement of the cutting element, wherein a receiving slot is defined by the second stopper, a portion of a surface of the first body and a portion of a surface of the second body and configured to receive the cutting element in the closed state.

10. A multifunctional tool, comprising:

a docking frame, comprising a first body, having a first end portion, and a second body rearwardly extended integrally and inclinedly from the first body in a coplanar manner, wherein an inclusion angle larger than 90° and less than 150° is defined between the first body and the second body;

a first actuation assembly pivotally mounted to the first body;

a second actuation assembly comprising a cutting element pivotally and movably mounted to the second body in a foldable manner, adjacent to a joint position where the first body and the second body connected, such that the cutting element is able to be rotated about a pivot axle, to selectively move to an open state, that the cutting element is rotated to unfold and extend out, or a closed state, that the cutting element is rotated to fold to overlap with the second body, such that when the cutting element is in the close state, the cutting is located and overlapped on a side wall of the first body while a blade of the cutting element is facing inwards to avoid exposing outside, and that when the cutting element is in the open state, the blade of the cutting element is facing outwards and the second body, which is extended inclinedly with respect to the first body, is positioned away from the blade of the cutting element to ensure safety while the first body is used as a gripping arm for a user gripping thereon and increasing a leveling force for acting against an object being act upon; and a dovetail member, having a triangular cross section, integrally and inclinedly formed at a rear end of the second body, wherein the dovetail member comprises a first wedge tip having a first tip width and a second wedge tip having a second tip width, and has a gap formed between the first wedge tip and the second wedge tip, such that the first wedge and the second wedge tip are coplanar with the first body and the second body and configured to be used independently as a screwdriver tip for driving screws within a corresponding size range and be combined to use a large size screwdriver tip by inserting both the first wedge tip and second wedge tip into a slot of a screw with large size, wherein the gap formed between the first wedge tip and the second wedge tip renders the dovetail member to be used as a nail puller, wherein the inclusion angle between the first body and the second body and sizes of the first body and the second body are arranged to allow the first body to be used as the gripping arm for four fingers of the user gripping thereon and a thumb of the user pressing down against the second body while the dovetail member is used as the screwdriver or the nail puller.

11. The multifunctional tool, as recited in claim 10, wherein the first actuation assembly comprises an engaging member integrally formed at a front end of the first end portion of the first body and an engaging head pivotally mounted to first end portion of the first body, such that an engaging opening is formed and defined between the engaging member and the engaging head and configured to be adjusted between an open state and a closed state for a predetermined angle ranged between 0° to 90°, wherein in the open state, the engaging head is moved away from the engaging member for 90° between the engaging head and the engaging member, and in the closed state, the engaging head is moved towards the engaging member for 0° between the engaging head and the engaging member.

12. The multifunctional too, as recited in claim 11, wherein the engaging head comprises a neck portion, a beak portion integrally extended from the neck portion, and a crown portion extending outwards from the beak portion, wherein a first serrated jaw is provided on the engaging member at the first end portion of the first body and a second serrated jaw is provided on an inner wall of the beak portion of the engaging head, such that the engaging opening is defined between the first serrated jaw and the second serrated jaw.

13. The multifunctional tool, as recited in claim 12, the docking frame further comprises a stopper formed integrally on the first end portion of the first body and configured to block an unintended movement of the engaging head so as to ensure the predetermined angle of the engaging opening ranged between 0° to 90°.

14. The multifunctional tool, as recited in claim 13, wherein the docking frame further comprises a second stopper integrally formed in the first body and the second body and configured for blocking an unintended movement of the cutting element.

15. The multifunctional tool, as recited in claim 13, wherein a receiving slot is defined by the second stopper, a portion of a surface of the first body and a portion of a surface of the second body and configured to receive the cutting element in the closed state.

16. The multifunctional tool, as recited in claim 10, wherein the docking frame further comprises a second stopper integrally formed in the first body and the second body and configured for blocking an unintended movement of the cutting element.

17. The multifunctional tool, as recited in claim 16, wherein a receiving slot is defined by the second stopper, a portion of a surface of the first body and a portion of a surface of the second body and configured to receive the cutting element in the closed state.

18. The multifunctional tool, as recited in claim 17, wherein the docking frame further comprises a meandering member integrally formed at the first body configured to function as a bottle opener for a cap of a bottle, wherein a meandering slot is defined by a curved wall of the meandering member and a side wall of the first body, such that the meandering member is capable of engaging the cap of the bottle by a slope surface while a surface of another side of the bottle cap is pressed by the side wall of the first body, thereby the cap is able to be pried from the bottle by means of leverage.

19. The multifunctional tool, as recited in claim 16, wherein the docking frame further comprises a meandering member integrally formed at the first body configured to function as a bottle opener for a cap of a bottle, wherein a meandering slot is defined by a curved wall of the meandering member and a side wall of the first body, such that the meandering member is capable of engaging the cap of the bottle by a slope surface while a surface of another side of the bottle cap is pressed by the side wall of the first body, thereby the cap is able to be pried from the bottle by means of leverage.

20. The multifunctional tool, as recited in claim 10, wherein the docking frame further comprises a meandering member integrally formed at the first body configured to function as a bottle opener for a cap of a bottle, wherein a meandering slot is defined by a curved wall of the meandering member and a side wall of the first body, such that the meandering member is capable of engaging the cap of the bottle by a slope surface while a surface of another side of the bottle cap is pressed by the side wall of the first body, thereby the cap is able to be pried from the bottle by means of leverage.

* * * * *